United States Patent
Zhu et al.

(10) Patent No.: US 6,323,860 B1
(45) Date of Patent: Nov. 27, 2001

(54) CIRCUIT AND METHOD FOR DEFERRING THE BINDING OF RENDER STATES TO PRIMITIVES IN A GRAPHICS SYSTEM

(75) Inventors: Ming Benjamin Zhu, San Jose; Scott C. Heeschen, Campbell, both of CA (US)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 09/271,026

(22) Filed: Mar. 17, 1999

(51) Int. Cl.⁷ ...................................................... G06F 15/00
(52) U.S. Cl. ............................................................ 345/427
(58) Field of Search .................................... 345/427, 428, 345/425, 418, 419, 117, 118

(56) References Cited

U.S. PATENT DOCUMENTS

| | | | |
|---|---|---|---|
| 4,645,459 | * | 2/1987 | Graf et al. ............................... 434/43 |
| 5,706,481 | * | 1/1998 | Hannah et al. ........................ 395/419 |

\* cited by examiner

*Primary Examiner*—Phu K. Nguyen
(74) *Attorney, Agent, or Firm*—Townsend and Townsend and Crew LLP

(57) ABSTRACT

A method performed in a graphics processor postpones the processing of one or more changes in render state until after one or more tiles that are affected by a primitive are identified (e.g. by use of a bounding box around the primitive to identify tiles within the bounding box, or by visiting an area enclosed by vertex tiles and edge tiles of the primitive to identify tiles covered by the primitive). The method may be performed by: storing value(s) of render state(s) on receipt, receiving one or more primitives affected by the render state(s), identifying from among a number of render state(s) whose values are being stored one or more render state(s) whose values have changed since last update to a tile covered by a received primitive, and associating with the covered tile the changed render states. Such a deliberate delay in association of changed render states eliminates the need to process render state(s) for tiles that are not identified as being covered by a received primitive, and render states that have not changed for such tiles, thus saving processing power and memory bandwidth. Identification of a render state that has changed since the last update to a tile can be accomplished in any manner, e.g. (1) by storage of a sequence signal (such as a time stamp) that indicates the order in which render states (and optionally primitives) are received, and are updated to a tile, or (2) by comparison of render state values that were previously updated to a tile, with the most current render state values, or (3) by some combination of (1) and (2).

12 Claims, 16 Drawing Sheets

CIRCUIT AND METHOD FOR DEFERRING THE BINDING OF RENDER STATES TO PRIMITIVES IN A GRAPHICS SYSTEM

CROSS REFERENCE TO RELATED APPLICATIONS

This application is related to, and incorporates by reference herein in their entirety, the following concurrently filed, commonly owned U.S. patent applications:

U.S. Ser. No. 08/978,491 filed by Ming Benjamin Zhu on Nov. 25, 1997, entitled "Rendering Pipeline";

U.S. Ser. No. 09/271,636 filed concurrently herewith, by Ming Benjamin Zhu and Scott Heeschen, entitled "Optimized System and Method For Binning of Graphics Data";

U.S. Ser. No. 09/271,613 filed concurrently herewith, by Scott C. Heeschen, entitled "A Circuit And Method For Processing Render Commands In A Tile-Based Graphics System"; and U.S. Ser. No. 09/271,637 filed concurrently herewith, by Oana Baltaretu et al., entitled "A Method For Determining Tiles In A Computer Display That Are Covered By A Graphics Primitive".

CROSS REFERENCE TO MICROFICHE APPENDIX

Appendix A, which is part of the present disclosure, is included in a microfiche appendix consisting of 1 sheet of microfiche having a total of 31 frames, and the microfiche appendix is incorporated herein by reference in its entirety. Microfiche Appendix A is a listing of pseudo code for computer programs and related data that can be prepared in the language VERILOG for implementing circuitry including a render state controller that receives and stores graphics data for the generation of a screen display, for use with one illustrative implementation of this invention as described more completely below.

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

A personal computer 10 (FIG. 1) includes a graphics processor 14 that generates a display of a three-dimensional (abbreviated as "3D") image on a screen 11 under the control of a central processing unit 15. Graphics processor 14 forms the displayed image 19 from graphics primitives describing the geometry of surfaces to be displayed (e.g. soda-can 17 and table 18), and render states (such as the soda-can texture and the table texture) that indicate the colors to be displayed in the surfaces.

An image displayed on screen 11 is typically formed by colors of a two-dimensional array of picture elements (called "pixels"). The pixel colors are normally generated by an application program being executed by CPU 15 in terms of graphics primitives (e.g. triangles and strips) that define the boundaries of various surfaces in the image, and render states (e.g. texture, culling, and fog) that define the appearance of the surfaces (e.g. brick, fur, etc). CPU 15 normally specifies each graphics primitive in terms of its vertices. Moreover, CPU 15 specifies each render state as two parts: a name (such as texture), and a value (such as brick).

A description (hereinafter "graphics API") of the format of such render states and primitives is provided in a book entitled "OpenGL Reference Manual, The Official Reference Document for OpenGL, Release 1," by OpenGL Architecture Review Board, Addison-Wesley Publishing Company, Reading, Massachusetts, 1992. See also the related book entitled "OpenGL Programming Guide" by Jackie Neider, Tom Davis, and Mason Woo, Addison-Wesley Publishing Company, Reading, Massachusetts, and another book entitled "3D Computer Graphics: A User's Guide for Artists and Designers" by Andrew S. Glassner, Design Press, New York.

In an example using the just-described API, when an image of soda-can 17 on table 18 is to be displayed, an application program executed by CPU 15 specifies one or more render states for soda-can 17, followed by one or more primitives for soda-can 17, and thereafter specifies one or more render states for table 18, followed by one or more primitives for table 18.

According to the API, the definition of render states is "sticky" in the sense that once a render state is specified, that render state need not be specified again until changed, i.e. each render state is effective for all graphics primitives that follow the render state, until the render state is changed. Therefore, if image 19 is to be shown as foggy, the application program being executed by CPU 15 merely turns on the fog state once, prior to specifying the soda-can primitives, and the fog state remains effective for the table primitives even though not explicitly specified. The graphics data (render states and primitives) that are generated by the application are normally processed by another program (called "graphics driver") that is executed by CPU 15. CPU 15 (when programmed with the graphics driver) "binds" the render states to the primitives by supplying these data together to graphics processor 14.

In a tiled architecture, graphics processor 14 divides screen 11 into rectangular areas (called "tiles") T1-TP, and each tile TI contains a number of pixels (e.g. 16 pixels) that form a portion of the displayed image. Each tile TI is held and processed one at a time in an on-chip memory (not labeled) included in graphics processor 14 (FIG. 1). Tiles T1-TP can be of any rectangular shape, but typically might be 32 pixels high and 32 pixels wide. For a screen having 640×480 pixels, there may be 300 tiles arranged in a rectangle that is 20 tiles wide and 15 tiles high.

SUMMARY OF THE INVENTION

In accordance with the invention, a controller (also called "render state controller") included in a graphics processor performs a method to postpone the processing of one or more changes in render states (also called "modes") that are being received from a central processing unit (CPU) until after one or more tiles that are affected by a graphics primitive are identified (e.g. by use of a bounding box around the primitive to identify tiles within the bounding box, or by visiting an area enclosed by vertex tiles and edge tiles of the primitive, to identify only tiles covered by the primitive in a precise manner).

In one embodiment, the render state controller implements the method by: (1) storing the value(s) of one or more render state(s), (2) receiving one or more primitive(s) affected by the render state(s), (3) with respect to a tile that is affected by a received primitive, identifying from among all render states, those render states whose values have changed (relative to values previously associated with that affected tile), (4) retrieving the value(s) of the changed render state(s), and (5) associating the affected tile with the value(s) of the render state(s) identified as having changed. In this embodiment, the just-described acts (3)–(5) are repeated for each tile that is affected by each received primitive, so that only the changed render states for the affected tiles are associated with each primitive.

In one implementation, the render state controller performs the just-described acts (1)–(5) on graphics data for a frame that is subsequent to another frame currently being rendered by a rendering pipeline that processes graphics data one tile at a time. In another implementation, the render state controller performs the just-described acts (1)–(5) on graphics data for a frame that is same as the frame currently being rendered by a rendering pipeline that operates on two or more tiles simultaneously (e.g. the rendering pipeline may include a number of tile renderers, each tile renderer operating on a single tile or on tiles in a single column (or row) of the screen).

Delaying the processing of render state changes (by use of a technique referred to as "deferred render state binding") until after identification of affected tiles and until after identification of changed render states eliminates the need to later on process (e.g. during rendering) render state(s) for one or more tiles that are not affected by a primitive, and render state(s) that have not changed, thus saving the down-stream processing power and memory bandwidth that would be otherwise required. Therefore, deferred render state binding eliminates the need to process every change in render state for every tile (as required in the prior art). Instead, only the changes in render state(s) for affected tiles are processed as described herein.

In one example, a primitive for a soda-can fits within a tile in the upper-left corner of the screen, and the soda-can primitive and the render state changes (such as the soda-can texture) are not further processed (in one implementation) for the remaining tiles in the screen, such as the tile in the lower-right corner of the screen. In this example, if there are 300 tiles in the screen, the down-stream processing of primitive and render state changes is eliminated for 299 tiles (because such processing is done only for the upper-left corner tile). Therefore, deferred render state binding takes advantage of locality in the processing of changes in render state by processing only those primitives that are affected by such changes.

Such deferral also eliminates the processing of temporary changes in a render state if the temporary changes overwrite each other. Specifically, only the final value of a render state at the time a primitive is received is processed for a tile covered at least partially by that primitive. For example, if the texture state changes its value from table to soda-can, thereafter to fur, thereafter to coffee-mug, and thereafter to soda-can, then only the value soda-can is associated with the upper-left corner tile when the soda-can primitive is received. Therefore, there is no mechanism in one embodiment to reconstruct the history of a render state, although other embodiments can include such mechanisms.

Furthermore, as only one or more changed value(s) of render states are associated with a tile, the method eliminates the need to process unchanged render states for every primitive that is associated with a tile. Instead, each tile is initially associated with default values of all render states, and thereafter only changes in render states are processed for each tile. Moreover, as only a changed render state is associated with each tile, when a second primitive uses the same render state (e.g. the soda-can texture) as a first primitive, the same render state is not processed a second time for the second primitive, in a tile covered at least partially by both primitives. Instead, only the second primitive is associated with the tile (e.g. to use the same soda can texture in displaying a second soda-can in this tile).

Identification of a render state that has changed its value can be accomplished in any manner, e.g. (1) by storage of a sequence signal (also called "receipt sequence signal," such as a time stamp from a clock source) that indicates the order in which the values of render states are received, storage of the sequence signal when the render states are identified for an affected tile, and comparison of these two stored signals, or (2) by storage of a number of render states values at the time of receipt and also at the time of association, and comparison of the two stored values of the same render state. Thereafter, only the changed render states are associated with the affected tile.

In a first embodiment that requires comparisons, the render state controller is coupled to a first memory (also called "next frame memory") in the graphics processor that has a number of storage units, wherein each storage unit includes at least two storage elements: a render state storage element that holds the value of the render state at the time of receipt by the graphics processor, and a receipt sequence storage element that holds a signal indicative of the time order of receipt of the render state held in the render state storage element. The render state controller is also coupled to a second memory (also called "tile-specific memory") that is either included in the graphics processor or is implemented in a separate device coupled thereto. The second memory also has a number of storage elements (also called "update sequence storage elements") that hold for each tile the sequence signal at the time of last update of the render states to that tile. In the first embodiment, a receipt sequence signal from a receipt sequence storage element is compared with a corresponding update sequence signal for a tile, to determine the changed render states for that tile.

In a second embodiment that also requires comparisons, a first memory (also called "next frame memory") in the graphics processor also includes a number of storage elements (also called "render state storage elements") that store the most current values of the render states, as they are received from the CPU. The second embodiment also uses a tile-specific memory having another group of storage elements (also called "previous value storage elements") that hold values of the render states that were most recently used (for each tile). In the second embodiment, the render state controller compares each current value from the next frame memory with each corresponding previous value from the tile-specific memory to determine the render states that have changed for the tile. Therefore, each of the first embodiment and the second embodiment requires the comparison of a signal held in a next frame memory with a signal held in a tile-specific memory.

Association of a changed render state with a tile can be accomplished in any manner, e.g. by copying the state's value into a corresponding storage location for the tile, or by copying a pointer to the value into such a storage location. Furthermore, association of the primitive with a tile can also be accomplished in any manner, e.g. by copying the primitive itself into a similar storage location, or copying only a portion of the primitive (wherein the portion intersects the tile).

BRIEF DESCRIPTION OF THE DRAWINGS

FIG. 2A-1 illustrates portions (shown hatched) of a polygon of FIG. 2A that intersect the respective tiles.

DETAILED DESCRIPTION

Figure 1:
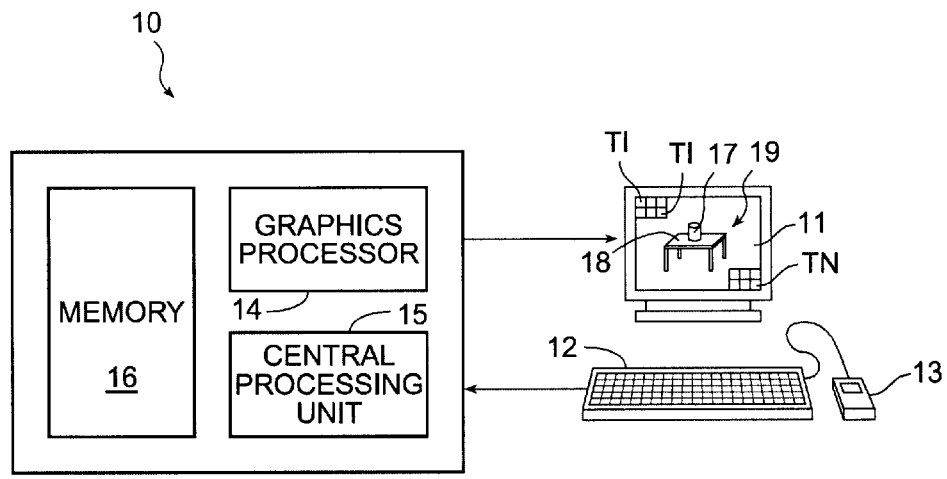
FIG. 1 illustrates, in a high level block diagram, a prior art computer graphics system.

A computer 200 (FIG. 2A) in accordance with this invention includes a circuit (also called "render state controller") 217 that implements a method described herein, to postpone the binding of render states to a primitive until after identification of tiles 201A–201P (wherein A≦J≦P, P being the total number of tiles) on a computer's screen 11 that are touched by the graphics primitive, such as convex polygon 202. Computer 200 can be, for example, a personal computer (PC), a graphics work station, or a game machine that includes a graphics processor 210.

In addition to render state controller 217, graphics processor 210 of one embodiment includes a geometry FIFO 207 that provides a number of polygons (in the form of x and y coordinates of the vertices) to a geometry tiler 212, and a render state FIFO 208 that provides a number of render states on input bus 218 of controller 217. Geometry tiler 212 of this embodiment identifies two or more types of tiles (e.g. edge tiles and interior tiles) that are covered by each visible polygon received from FIFO 207, as described in for example, the concurrently filed U.S. patent application, Ser. No. 09/271,637, entitled "A METHOD FOR DETERMINING TILES IN A COMPUTER DISPLAY THAT ARE COVERED BY A GRAPHICS PRIMITIVE" incorporated by reference above. Therefore, geometry tiler 212 can identify covered tiles by use of edges of a primitive (either approximately or precisely as described in the just-described U.S. patent application), or alternatively geometry tiler 212 can identify affected tiles (that include covered tiles and touched tiles) by use of a prior art bounding box method.

Figures 1, 2A:
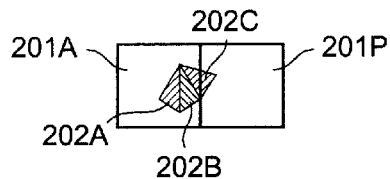
FIG. 2A illustrates, in a high-level block diagram, various components, such as a render state controller, included in a computer graphics system in one embodiment of the invention.

As illustrated in FIG. 2A, geometry tiler 212 is coupled by primitive assembler 215 to a render state controller 217 that binds to one or more tiles 201A–201P the render states and polygons that are relevant to covered tiles. Instead of binding polygon 202 (FIG. 2A-1) with each of tiles 201A and 201P, triangles 201A–201C (that form a "portion", also called "subprimitive") illustrated in FIG. 2A-1 that intersect 201A are bound to tile 201A, and triangle 202C that intersects tile 201P is bound to tile 201P. Moreover, instead of binding the primitives or portions thereof as described herein, pointers to such primitives or primitive portions can be bound, depending on the embodiment.

Graphics processor 210 further includes a synchronizer 216 that receives tiles identified by geometry tiler 212, and render states identified by render state controller 217, and stores (via memory interface 213) the render states and primitives segregated for each tile 201J in a binning memory 231 (that is part of a graphics memory 230).

Items 215 and 217 are coupled to a synchronizer 216 that together with tiler 212 are included in a binning engine 240 that together with rendering pipeline 255 are included in graphics processor 210. Graphics processor 210 and graphics memory 230 may be implemented as described in for example, the concurrently filed U.S. patent application Ser. No. 09/271,636, entitled "Optimized System and Method For Binning of Graphics Data" incorporated by reference above. Such a binning engine 240 may include two FIFOs that are respectively coupled to items 217 and 212. Note that items 212 and 213 can be implemented differently in other embodiments, and are not critical aspects of such other embodiments.

In addition to binning engine 240, graphics processor 210 also includes a rendering pipeline 255 that reads the segregated information for each tile from binning memory 231, and generates pixels that are stored in a frame buffer memory 232 for display in the respective tile 201J on screen 11. Note that depending on the implementation, graphics memory 230 (that includes binning memory 231 and frame buffer memory 232) can be merged into system memory 203 (FIG. 2A), and thus create a unified memory architecture.

In the implementation described above, render state controller 217 operates on graphics data for a frame that is subsequent to another frame currently being rendered by rendering pipeline 255 that processes graphics data one tile at a time. In another implementation, render state controller 217 operates on graphics data for a frame that is same as the frame currently being rendered by rendering pipeline 255 (FIG. 2A) that operates on two or more tiles simultaneously as described below.

Figure 2B:
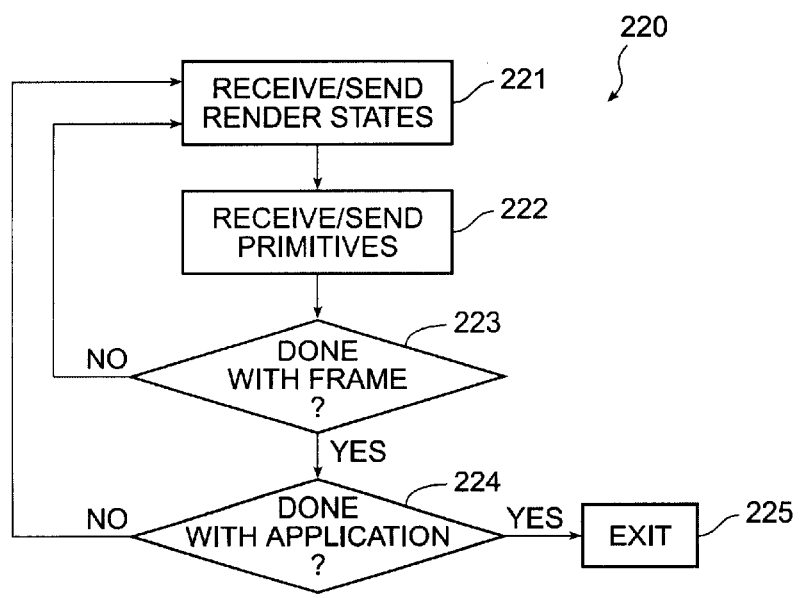
FIG. 2B illustrates, in a high-level flow chart, acts performed by CPU 204 of FIG. 2A when programmed with instructions of graphics driver 220 held in memory 203 of FIG. 2A.
Figure 2A:
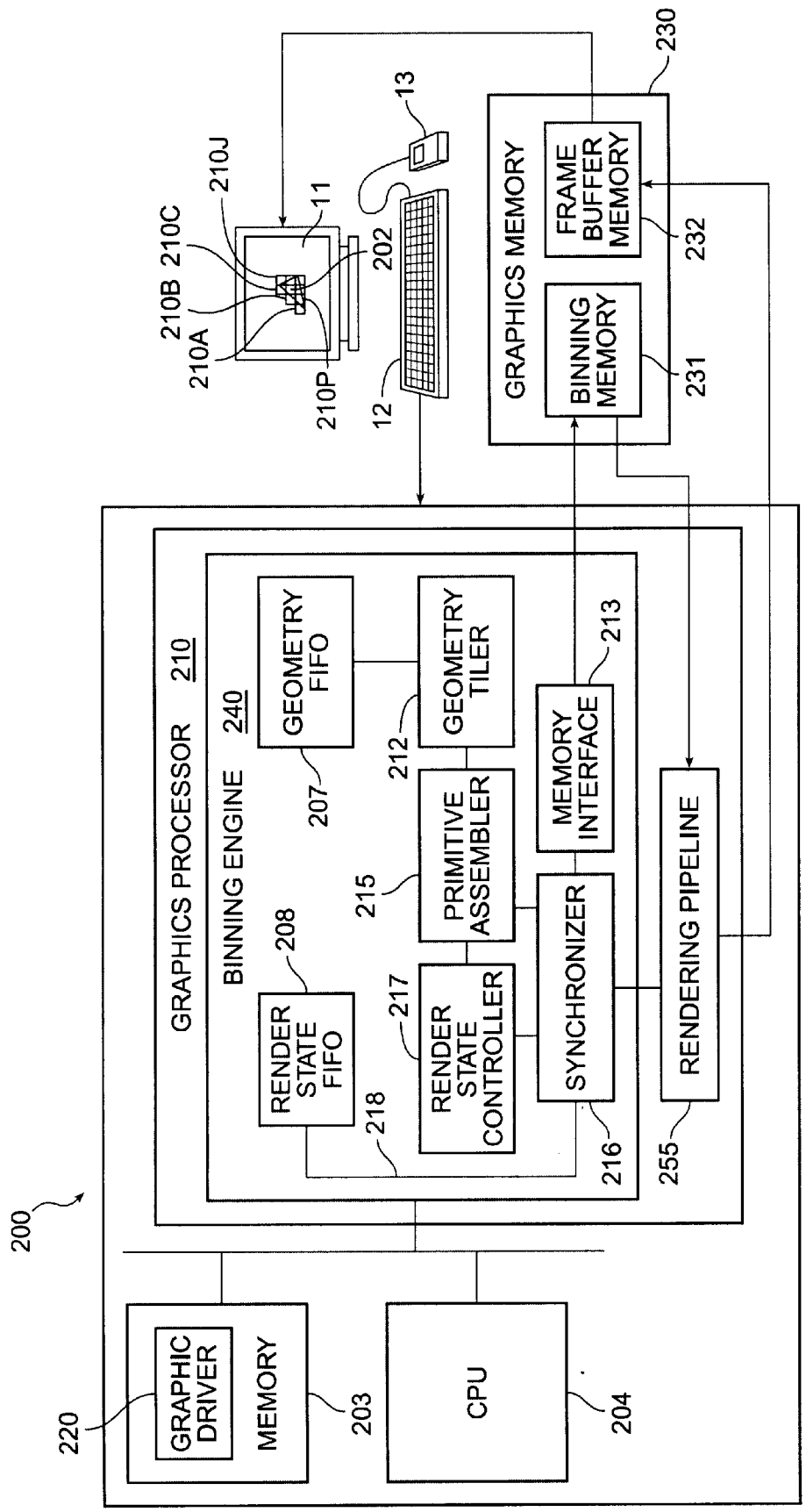

In the embodiment illustrated in FIG. 2A, computer 200 includes, held in system memory 203, a graphics driver 220 that is executed by CPU 204 to send graphics data (render states, render commands, and primitives) to graphics processor 210. Specifically, in act 221 (FIG. 2B), CPU 204 under the direction of graphics driver 220 receives values of render states that have changed from an application program (not shown in FIG. 2A) and forwards the received values and identities of the changed render states directly to graphics processor 210.

Thereafter, in act 222, CPU 204 receives one or more triangles (in the form of vertices) from the application program and sends the received triangles directly to graphics processor 210, again with minimal processing in CPU 204

(such minimal processing may include lighting, clipping, and transforming vertices of triangles from a modeling space to the screen). In act 223, CPU 204 checks if the application is done with the current frame (defined to be values of all pixels on screen 11). If not, CPU 204 returns to act 221 to send additional data. Thereafter, CPU 204 checks (in act 224) if done with all data generated by the application. If not, CPU 204 returns to act 221, and if so CPU 204 completes execution of both graphics driver 220, and the application.

Therefore, graphics driver 220 of this implementation is a "thin" application that merely includes computer instructions for performing acts 221–223 in conformance with the above-described graphics API. The "thin" nature of graphics driver 220 has several advantages as compared to the prior art. For example, the "thinness" reduces the computing load that is required of CPU 204. Also, the conformance to graphics API provides backward compatibility for allowing the user to continue using the pre-existing applications. Moreover, the conformance to graphics API provides independence from the hardware implementation in graphics processor 210, so that the hardware can be changed without changing the application.

Binning engine 240 (FIG. 2C) of this embodiment includes an on-chip memory (such as latches, registers, SRAM or DRAM) that form a first memory 244 (also called "next frame memory") which includes a number of storage units (hereinafter "state storage units") 244A–244Z (wherein $A \leq I \leq Z$, Z being the total number of such storage units). The on-chip memory can (optionally, depending on the variant) include a second memory 249 (also called "tile-specific memory") which includes a number of storage elements that are used to hold information specific to a tile, such as an update sequence signal for each tile or values (hereinafter "previous values") of the render states most recently updated for each tile.

In a first variant illustrated in FIG. 2C, the storage elements in tile-specific memory 249 hold update sequence signals and are hereinafter referred to as update sequence storage elements 249A–249P (wherein $A \leq J \leq P$, P being the total number of such storage elements). In a second variant illustrated in FIG. 2D, a group of storage elements in tile-specific memory 249 hold previous values of the render states for each tile, are hereinafter referred to as sets 242A–242P wherein each set includes a number of previous storage elements, e.g. storage elements 242AA–242AZ, 242IA–242IZ and 242PA–246PZ. In an alternative embodiment, tile-specific memory 249 is included in binning memory 231 rather than in binning engine 240.

Render state controller 217 uses storage units 244A–244Z to temporarily hold the values of render state changes being received on a bus 218 (also called "first input bus") from CPU 204 (FIG. 2A), until information of a graphics primitive (e.g. in terms of the affected tiles) is received on another bus 233 (also called "second input bus") that is coupled to geometry tiler 212. Next, after identification of the relevant tiles (by geometry tiler 212 of FIG. 2A), render state controller 217 supplies the changed render states and the corresponding primitives for the identified tiles to an output bus (thereby to bind the changed render states with the primitive). Initially, at the beginning of processing of data from an application, render state controller 217 simply initializes (see act 261 in FIG. 2E) all render states to default values, e.g. by resetting a number of render state storage elements 247A–247Z that are included in the respective render state storage units 244A–244Z.

In addition, render state controller 217 also initializes (see act 261 in FIG. 2E) other values that are specific to a frame (such as setting the address of frame buffer 232 to one of two buffers (called "double buffers") that are alternately used to supply the signals to screen 11, or setting default values for depth clear (also called "z-clear")). Note that act 261 is an optional act that is not performed in one embodiment (e.g. because such an act is performed elsewhere—e.g. by driver 220 (FIG. 2A) or by rendering pipeline 255.

In addition to render state storage elements 247A–247Z, the respective render state storage units 244A–244Z can include additional storage elements (such as receipt sequence storage elements 245A–245Z) as may be required depending on the variant. Each render state storage element 247I holds the value of a single render state. A first render state storage element 247A holds the value of a first render state (e.g. texture state). In the example, the value of a texture state identifies the address of a texture to be used in generating pixel values for display on screen 11 (FIG. 2A). As another example, a second render state storage element 247I holds the value of a second render state, such as a fog state, and such a value identifies whether or not fog is to be used in displaying the image.

Thereafter, render state controller 217 receives (see act 262 in FIG. 2E) a change in render state (e.g. in the form of a name or identity of the render state being changed, and the changed value), and simply stores (see act 263) the received value (and optionally the identity or name of the changed render state, depending on the embodiment) in the appropriate one of render state storage elements 247A–247Z. As used herein, a "changed render state" is any render state whose value has changed from a previous value (that is typically received at the beginning of a frame).

Next, render state controller 217 checks (see act 264) if the incoming data is a primitive (e.g. by checking a "type" bit, also called "entry type" bit in an input buffer (not shown) also called "input FIFO"). If the data is not a primitive, render state controller 217 returns to act 262 (described above). If the data is a primitive, render state controller 217 goes to act 265 to receive the primitive. Note that in acts 262–264, render state controller 217 simply stores the received render states, and does not perform any processing on the received render states. Note that the received render states are those states whose values have changed (either from the default values or from previous values if the previous values were not default values) and if there are no changes in a state's value then that render state will not be received.

Figure 2C:
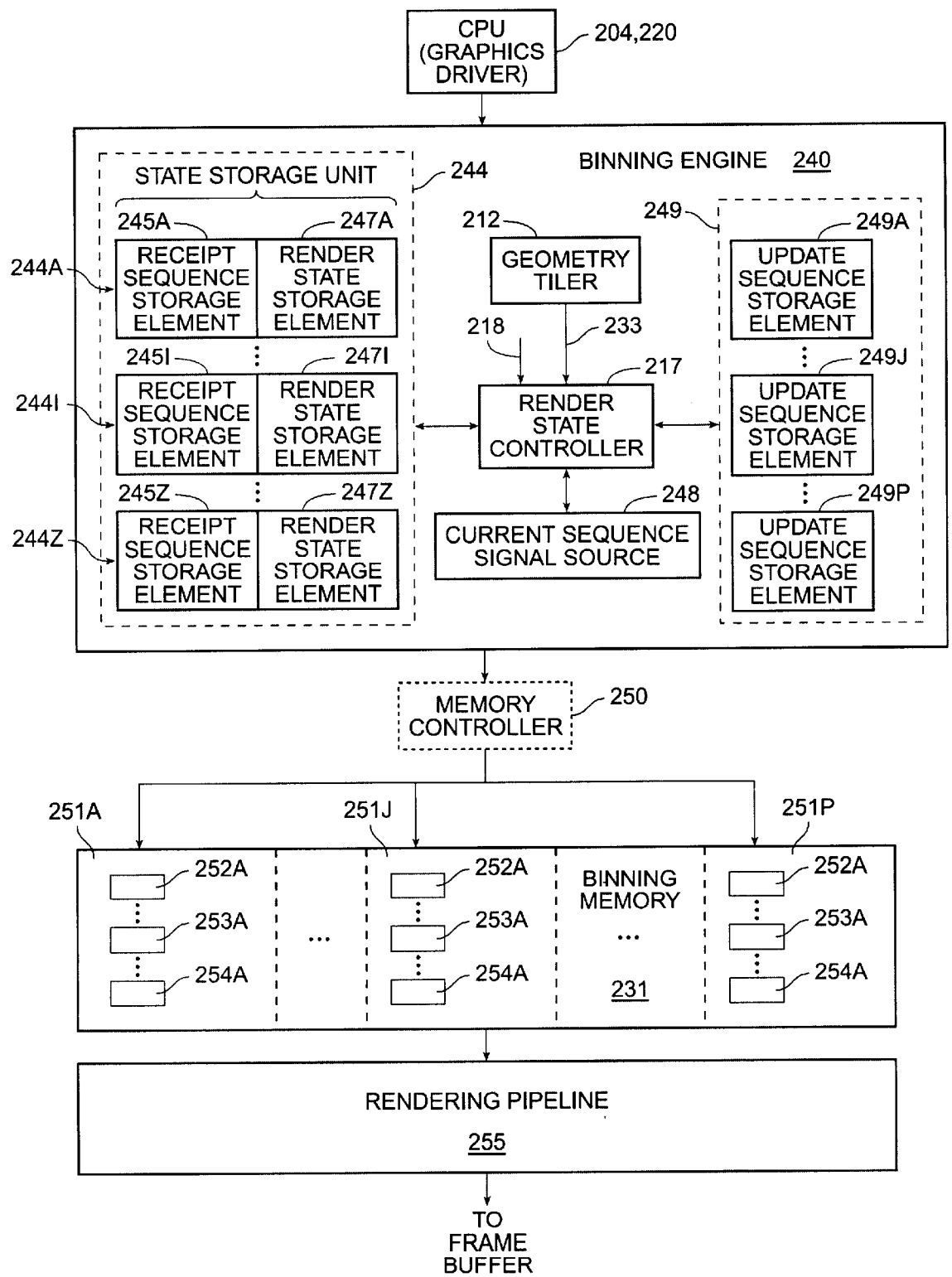
FIGS. 2C and 2D illustrate, in intermediate-level block diagrams, two variants of the graphics processor illustrated in FIG. 2A.
Figure 2D:
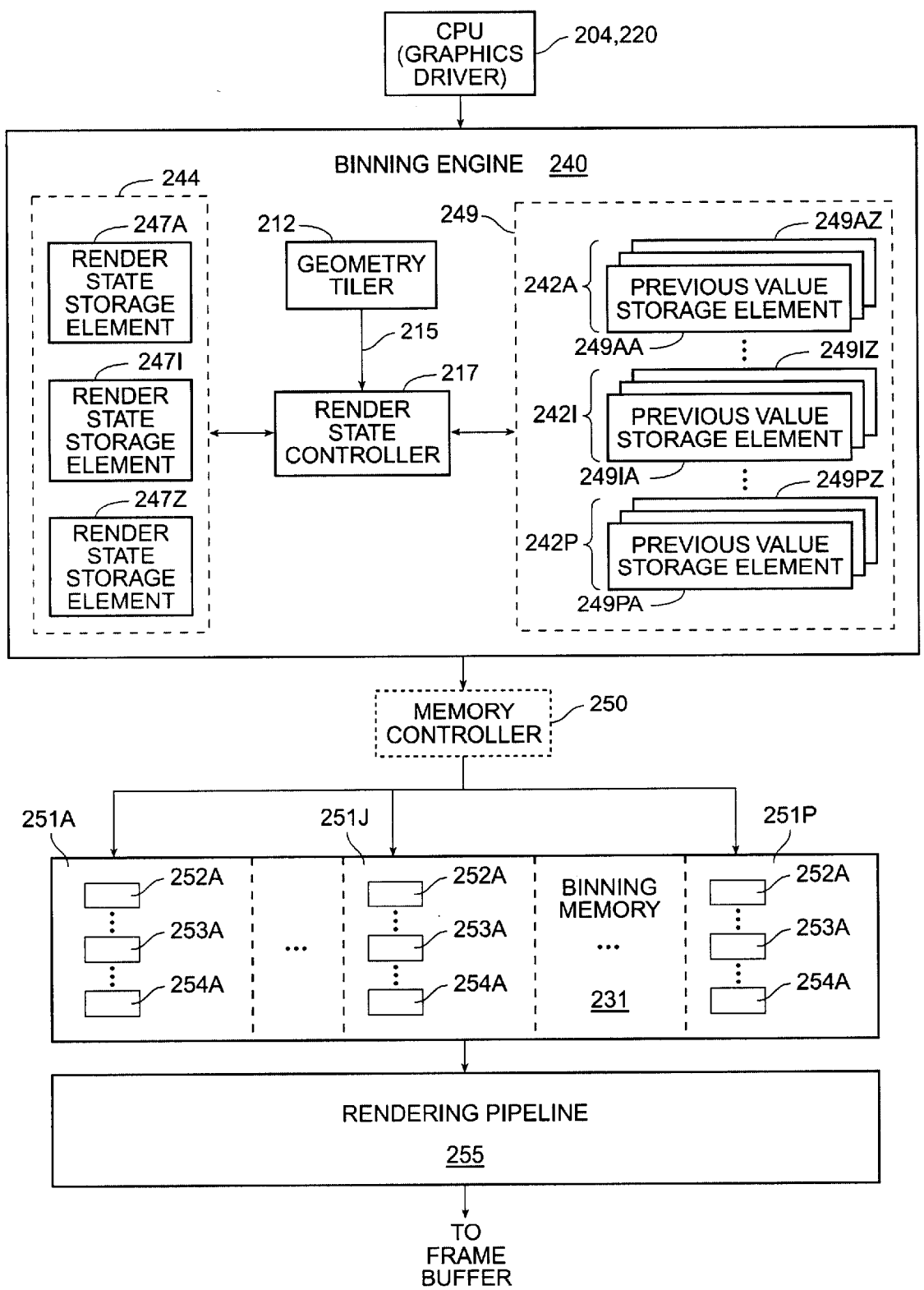

After receipt of a primitive (in act 265), render state controller 217 receives (in act 266) the identities of tiles that are covered by the received primitive from geometry tiler 212 (FIG. 2C). Note that the processing for identification of covered tiles can be integrated with the processing of render state changes, for example by replacing the act of receiving (see act 266 in FIG. 2E) with acts performed by geometry tiler 212. Note that depending on the implementation, the tiles that are identified as being "affected" by a primitive may include tiles that are not actually covered by a graphics primitive, e.g. if a bounding box method is used to identify such tiles. Note also that tiles that are identified may also exclude tiles that are merely touched at a corner by the graphics primitive, but are not actually covered. Numerous such modifications will be apparent to the skilled artisan in view of the disclosure.

Once one or more tiles are identified as being affected by a graphics primitive, render state controller 217 goes to act 267 to identify (for each tile identity received in act 266) those render states whose values that have changed with respect to that tile (from among all the values held in render state storage elements 247A–247Z of FIG. 2C). Next, in act 268, render state controller 217 associates with an identified tile 201J (FIG. 2A) the following data: (1) one or more changed render states, and (2) the received primitive (or a part thereof relevant to the identified tile). The association can be performed by storing the changed value (or a pointer to the changed value in an alternative embodiment) in a memory region 251J (FIG. 2C) in binning memory 231 that is reserved for holding such information for the identified tile 201J for use by rendering pipeline 255. Note that in one specific implementation, only the render state changes that are received after the most recent association with a tile are associated in act 268, so that a render state change is associated only once with any given tile.

Therefore, one or more render states are only bound to the corresponding primitive in act 268, and only for the relevant tile that has been identified (as being covered by the primitive). The deferral of binding of at least one changed render state (e.g. from act 263 to act 268) is a significant aspect of this embodiment, because such deferral eliminates further processing (by rendering pipeline 255 illustrated in FIG. 2C) of render state changes for tiles that are not identified as being covered by the corresponding primitive.

Next, in act 269 (FIG. 2E), render state controller 217 checks if all tiles identified as being covered by the primitive have been processed. If not, render state controller 217 returns to act 267, and otherwise continues to act 270. In act 270, render state controller 217 checks if the incoming data is a render state, and if not, returns to act 265 to process one or more successive primitives (in the same manner as the just-described primitive). Note that render state controller 217 associates preexisting render state changes with the successive primitives, thereby to implement "sticky" behavior as described in the graphics API (above).

In act 270, if all successive primitives (defined to be primitives that follow one another without any intervening render states) have been processed, render state controller 217 goes to act 271 and checks if the incoming data is a frame boundary. If not, render state controller 217 returns to act 262 (described above) to process the render state changes being received. If all graphics data for the current frame has been processed, render state controller 217 goes to act 272 to check if done with data for the application, and if not awaits data for the next frame in act 261. If done with the application, render state controller 217 awaits graphics data from another (or same) application.

Figure 2E:
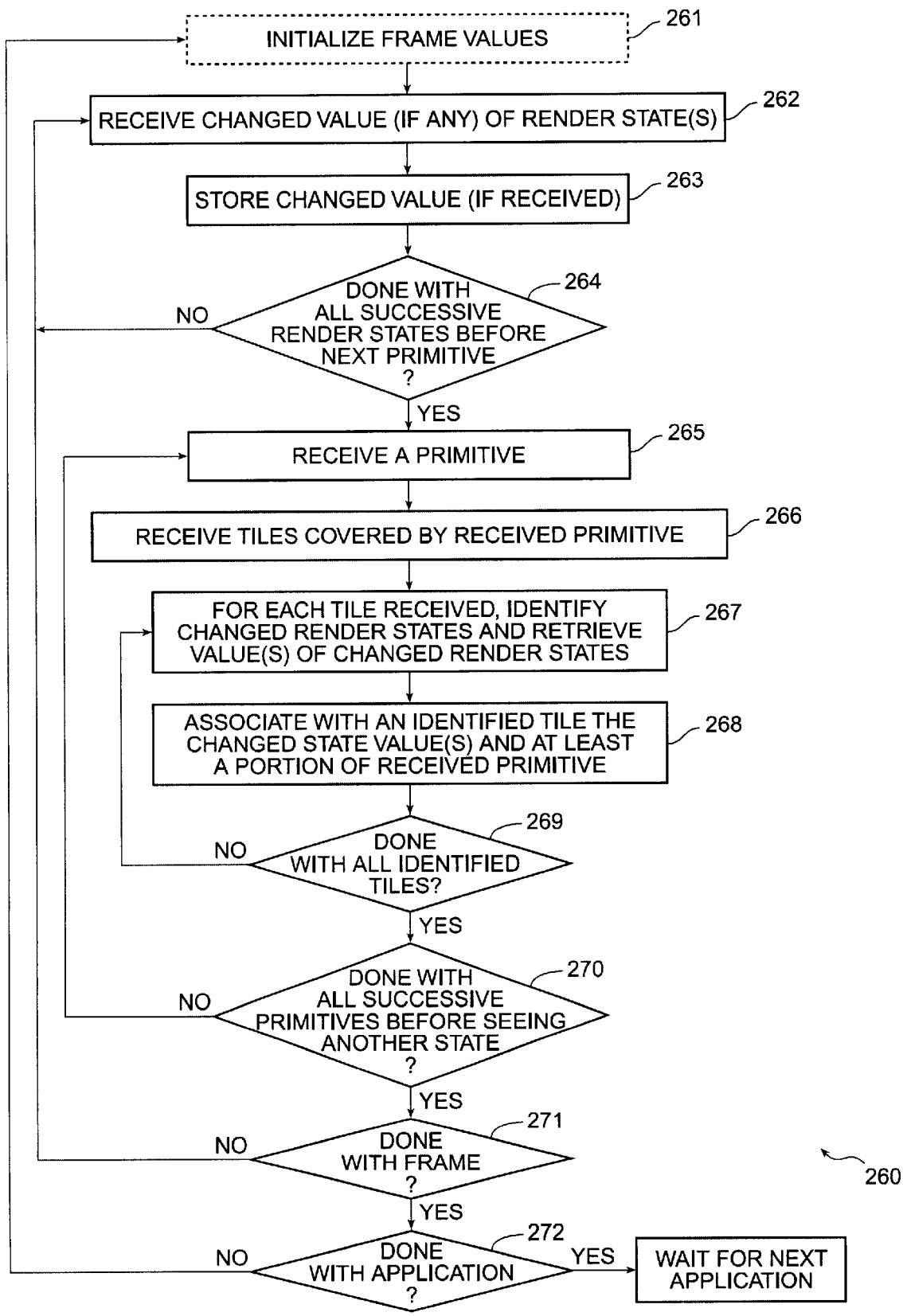
FIGS. 2E and 2F illustrate, in high-level flow charts, acts performed by a render state controller and by a rendering pipeline respectively that are included in the graphics processor illustrated in FIGS. 2A and 2C.
Figure 2F:
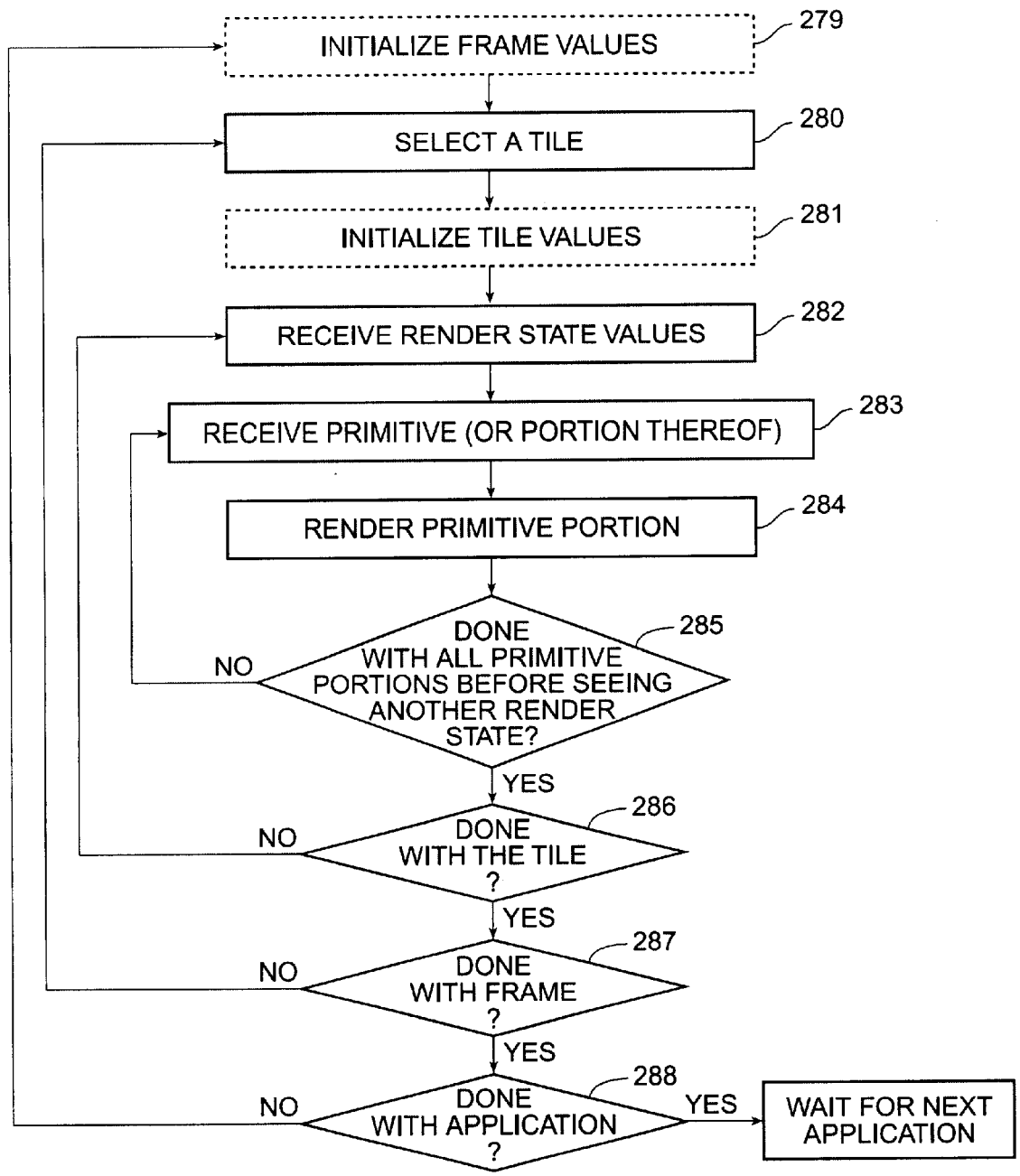

The data that has been placed in binning memory 231 by render state controller 217 (during receipt of the data for the previous frame) is processed by a rendering pipeline 255 (FIG. 2C) one tile at a time (during receipt of the data for the current frame). Specifically, on start up, rendering pipeline 255 initializes frame values (see act 279 in FIG. 2F). Note that the initialization of frame values need not be performed if act 261 in FIG. 2E is performed by the driver. Thereafter, rendering pipeline 255 selects (in act 280) a tile 201J (FIG. 2A) as one of a sequence of tiles in screen 11. Next, rendering pipeline 255 initializes (see act 281) certain values for the selected tile, including render state values that change during the binning (i.e. receipt and storage of packets containing graphics data) for the frame being rendered. Such initialization is also not required if the render state values remain unchanged (from default values) during binning of the frame being rendered.

Note that prior to receipt of the very first frame, render state values are initialized to default values (e.g. the texture state). The default values of render states are the initial values of all render states (both render states that change during a frame, and render states that remain unchanged). In one implementation, the default values are written by graphics driver 220.

Next, in act 282 (FIG. 2F), rendering pipeline 255 receives one or more render state values (values that changed) for tile 201J if the incoming data includes render state changes, and thereafter receives (in act 283) one or more primitives (or portions thereof) that affect tile 201J. In the just-described implementation, render state change(s) and primitive(s) are stored by render state controller 217 in a respective one of memory regions 251A–251P, and are retrieved therefrom by rendering pipeline 255.

Rendering pipeline 255 uses (in act 284) the changed render state(s) and the primitive (or portion) to generate the values of pixels in tile 201J. Next, in act 285, rendering pipeline 255 checks if a render state is received. If not, rendering pipeline 255 returns to act 283, and otherwise goes to act 286. In act 286, rendering pipeline 255 checks if all graphics data (render state changes and primitives) for the current tile have been processed, and if not returns to act 282, and if so goes to act 287. In act 287, rendering pipeline 255 checks if all graphics data (render state changes and primitives) for the current frame has been processed, and if not returns to act 280, and if so goes to act 288 to check if all data from the application has been received. If not, rendering pipeline 255 returns to act 279, and if so waits for data from the next application.

In one variant of the just-described embodiment, render state controller 217 uses receipt sequence signals held in a number of receipt sequence storage elements 245A–245Z (FIG. 2C) that are included in the above-described render state storage units 244A–244Z to identify (see act 267 in FIG. 2E; described above) all the changed render states from among the render states stored in next frame memory 244 (FIG. 2C). A receipt sequence signal is a copy of a signal (hereinafter "sequence signal") at the time of receipt of the corresponding render state by graphics processor 210.

In one implementation, the sequence signal is a signal that is generated by a source 248 to indicate an order in which render state changes are being received. In one such example, sequence source 248 is a storage element that holds a signal that is monotonically incremented (by render state controller 217) each time graphics data is received by render state controller 217, irrespective of whether the data is primitive or render state change. In another example, source 248 includes a clock source that automatically increments the sequence signal to indicate the elapsed time from the beginning of a frame. In another example, source 248 could use some encoding, such as gray codes to represent order.

In another implementation, the sequence signal is incremented by sequence source 248 only when a different type of data is received, i.e. the sequence signal remains the same as long as render state changes are being received, gets incremented when a primitive is received, remains same as long as successive primitives are received, and gets incremented when another render state change is received.

In this variant, render state controller 217 also uses update sequence signals held in a number of update sequence storage elements 249A–249P included in tile-specific memory 249 that in turn may be included in the on-chip memory of binning engine 240 (FIG. 2C). An update sequence signal is a copy of the sequence signal at the time that graphics data is associated with a tile, e.g. stored in a memory region 251J for a tile 201J. Comparison of an update sequence signal for a tile with a receipt sequence signal for a render state indicates whether or not that render state's value has changed since the last update to the tile. Therefore, such comparison is performed in this variant prior to retrieval of values of render states that have changed (see act 267 in FIG. 2E).

In this variant, render state controller 217 performs a method 300 (FIG. 3) that is similar or identical to method 260 (described above in reference to FIG. 2E) except for the following differences. In method 300 as well, render state controller 217 performs act 261 (described above), and thereafter resets all receipt sequence storage elements 245A–245Z (FIG. 2C) and update sequence storage elements 249A–249P in act 301. Next, render state controller 217 performs act 261A to initialize render state values, and then performs acts 262 and 263 (described above), and thereafter performs act 302 to store the sequence signal in a receipt sequence storage element 245I that corresponds to render state storage element 247I used in act 263.

Next, render state controller 217 performs act 264 (described above), and thereafter performs act 303 to increment the sequence signal. Then, render state controller 217 performs acts 265 and 266 (described above), and thereafter performs act 304 to identify one or more of render state storage units 244A–244Z whose receipt sequence signals (in the respective receipt sequence storage elements 245A–245Z) are more recent than the tile's update sequence signal (in the update sequence storage elements 249A–249P). In act 304, render state controller 217 also retrieves the values of the changed render states, for use in the next act 305.

Specifically, in act 305, render state controller 217 stores the value of the changed render states (identified in act 304), and also stores a portion of the primitive that covers the tile in memory region 251J that is reserved for tile 201J, and thereafter goes to act 269 (described above). At any time between acts 304 and 269, render state controller 217 also stores the sequence signal (at the present time) as the update sequence signal for tile 201J in the corresponding update sequence storage element 249J.

Figure 3:
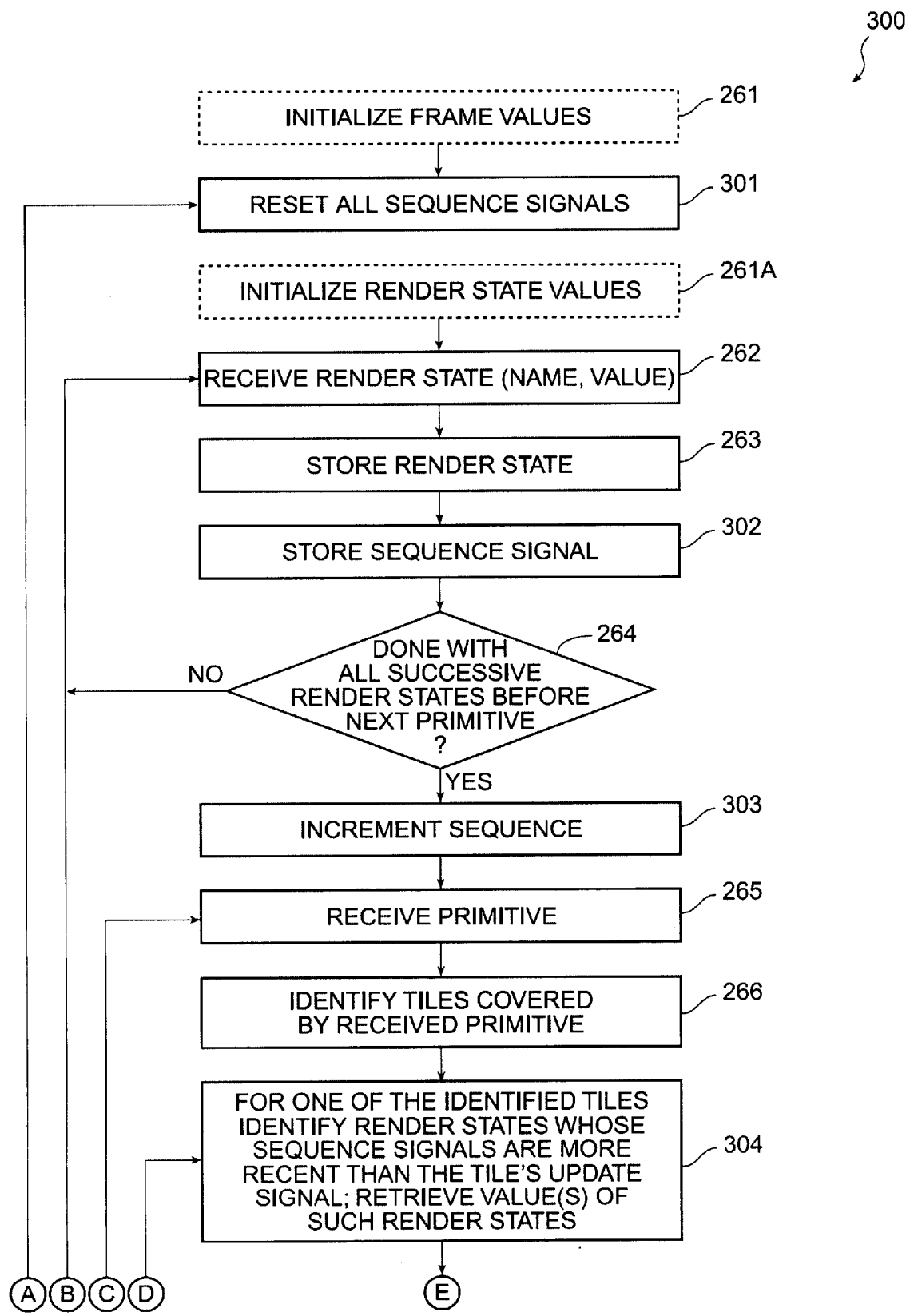
FIG. 3 illustrates, in an intermediate-level flow chart, acts performed by one variant of the render state controller illustrated in FIG. 2E.
Figure 3:
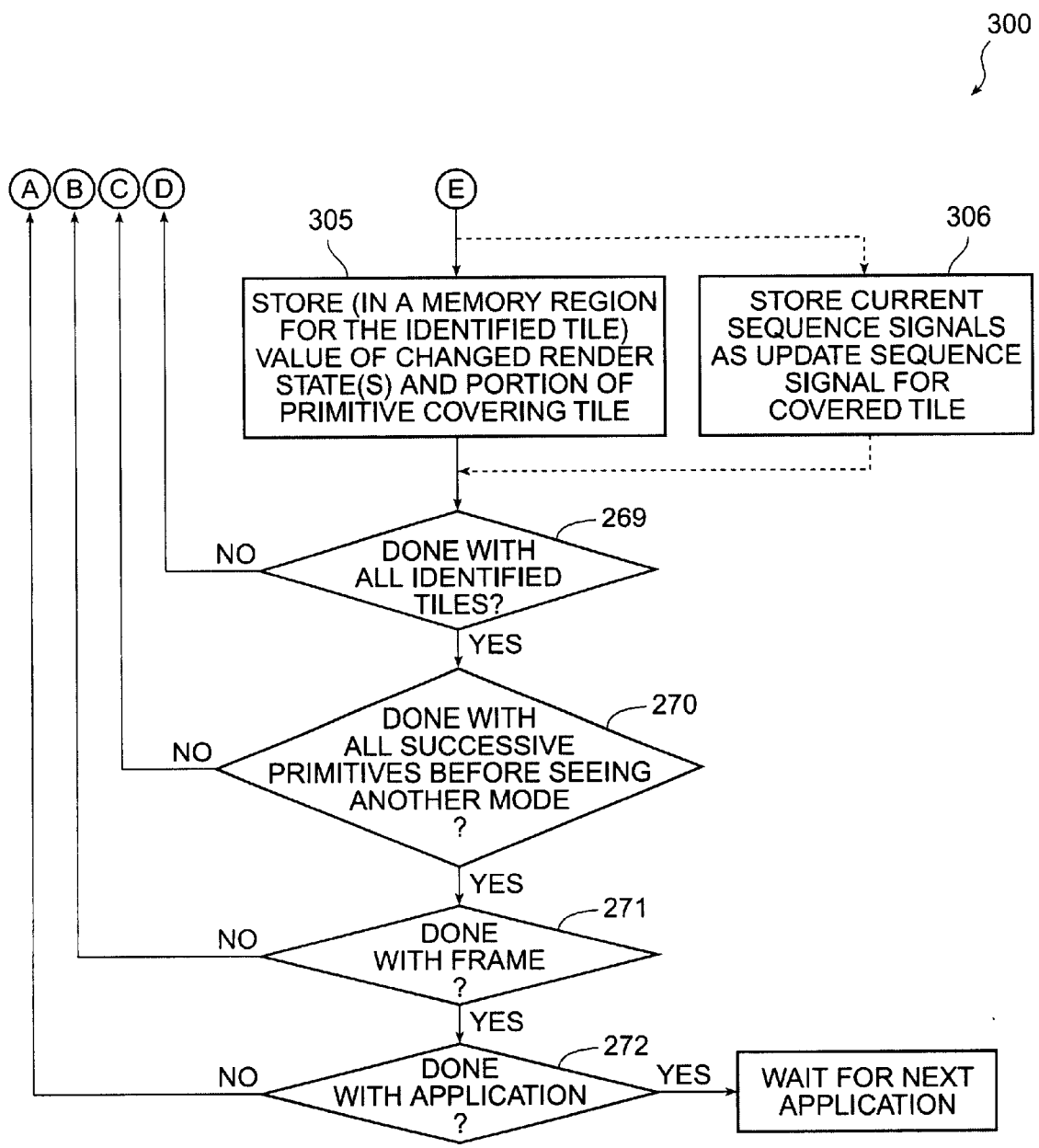
Figure 4A:
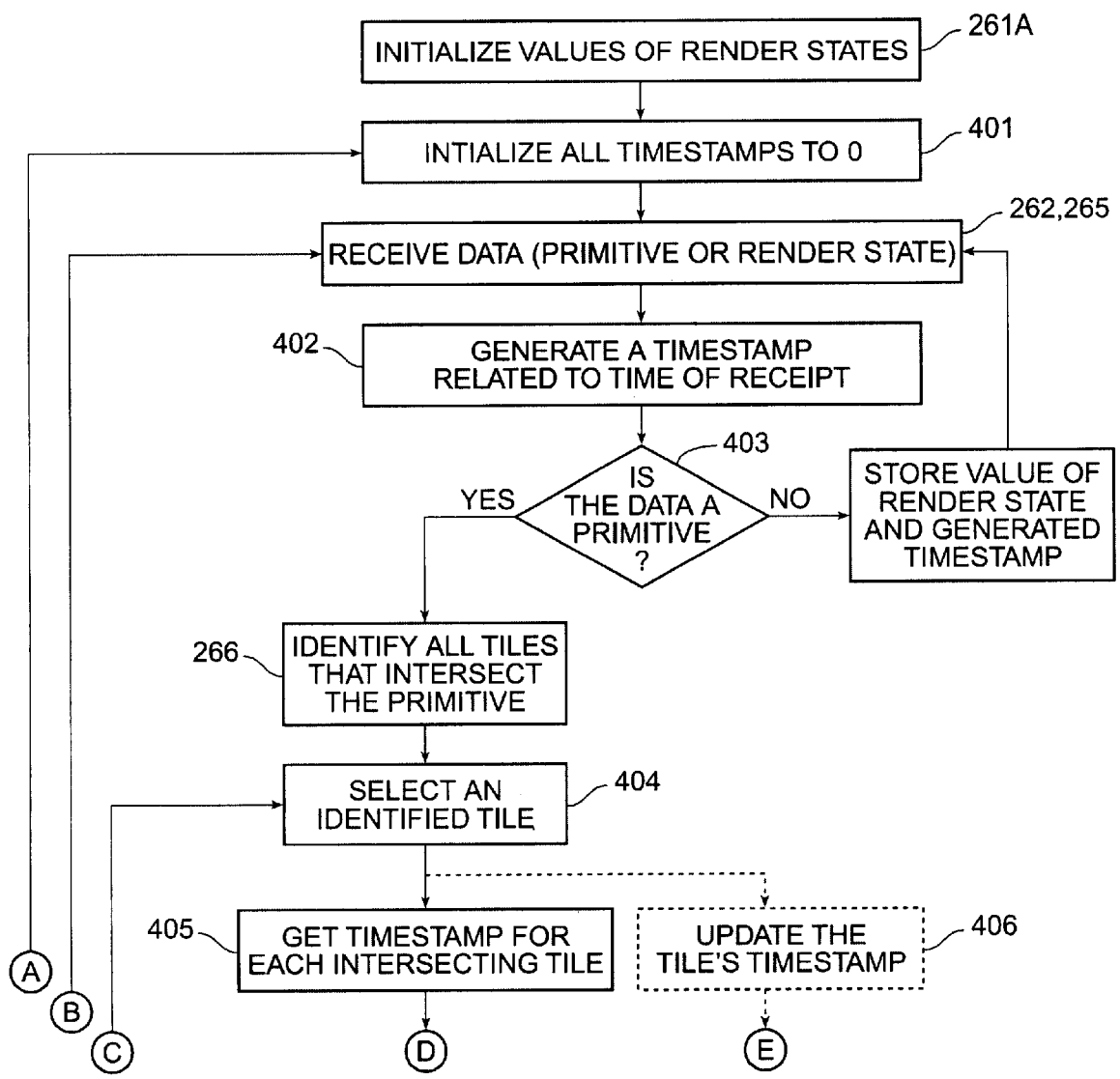
FIG. 4A illustrates, in a low-level flow chart, acts performed by a render state controller in one implementation of the controller illustrated in FIG. 3.
Figure 4A:
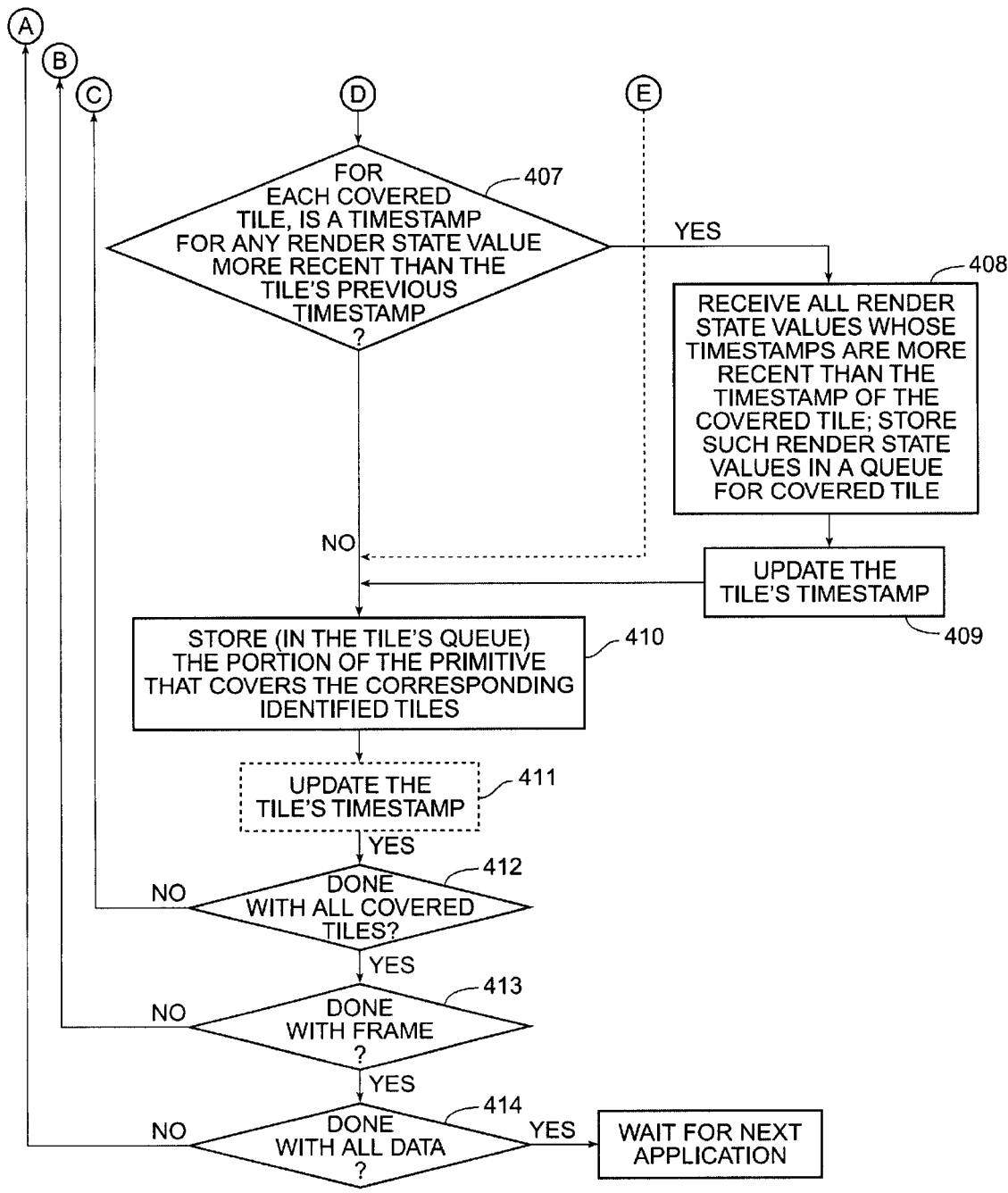

One implementation of the variant illustrated in FIG. 3 uses time as the sequence signal in a method 400 (FIG. 4A). The time can be an absolute time, such as the time of day, or a relative time, such as the time that has elapsed from the receipt of a marker that indicates the start of graphics data for a frame. In this implementation, timestamps that indicate the current time at which graphics data is received (from CPU 204), are stored in receipt sequence storage elements 245A–245 Z. Also, timestamps that indicate the current time at which comparison of signals (between the regions 244 and 249) is performed are stored in update sequence storage elements 249A–249P.

In method 400, render state controller 217 initializes (in act 401) all timestamp signals in storage elements 245A–245Z and 249A–249P to 0, and also performs acts 261, 262 and 265 as described above in reference to FIGS. 2E and 3. Next, in act 402, render state controller 217 copies the current time (from a clock source) into a variable (hereinafter "timestamp variable") thereby to generate a timestamp for use in indicating the time at which acts 262 and 265 were performed. Instead of copying the current time whenever data is received (in act 402), render state controller 217 of an alternative embodiment copies the current time only when the received data is of a different type than the type of data that was previously received.

Next, in act 403, render state controller 217 checks if the data received in acts 262 and 265 is a primitive. If not, render state controller 217 performs acts 263 and 302 to store the changed value of the render state and the generated timestamp. If the received data is a primitive, then render state controller 217 goes to act 266 (described above).

After identifying the covered tiles, for each covered tile 201J render state controller 217 retrieves (see act 405) from an update sequence storage element 249J the timestamp indicating the time at which the corresponding memory region 251J was last updated. At about the same time, but after act 407, render state controller 217 may update (see act 406) the timestamp in update sequence storage element 249J with the value in the timestamp variable. Alternatively, render state controller 217 updates the tile's timestamp at a later time (e.g. in act 409 described below).

Next, render state controller 217 goes to act 407 to check if the timestamp for any render state value is more recent than the tile's previous time stamp (currently held in update sequence storage element 249J in FIG. 2C). If so, render state controller 217 goes to act 408, retrieves all such changed render states, and stores the changed render states in a queue formed by storage elements 252J–254J in a region 251J in binning memory 231 that is dedicated for tile 201J. Next, render state controller 217 updates the tile's timestamp (in act 409) in update sequence storage element 249J and goes to act 410. If the decision in act 407 is no, render state controller 217 goes directly to act 410, and stores in the just-described tile queue the value of the primitive (or portion thereof).

Next, render state controller 217 goes to an optional act 411 to update a tile's timestamp, e.g. if the timestamp was not updated in acts 406 and 409. Thereafter, controller 217 goes to act 412 to check if all covered tiles of the primitive have been processed. If not, render state controller 217 returns to act 404 and otherwise goes to act 413 to check if all data for a frame has been processed. If not, render state controller 217 returns to acts 262 and 265. If all data for a frame has been processed, render state controller 217 checks (in act 414) if done with all frames for the application, and if not goes to act 401 and otherwise waits for the next application (returning to act 261 on receipt of data). Note that the tile's timestamp can be updated at any time, e.g. between acts 410 and 411.

Figure 4B:
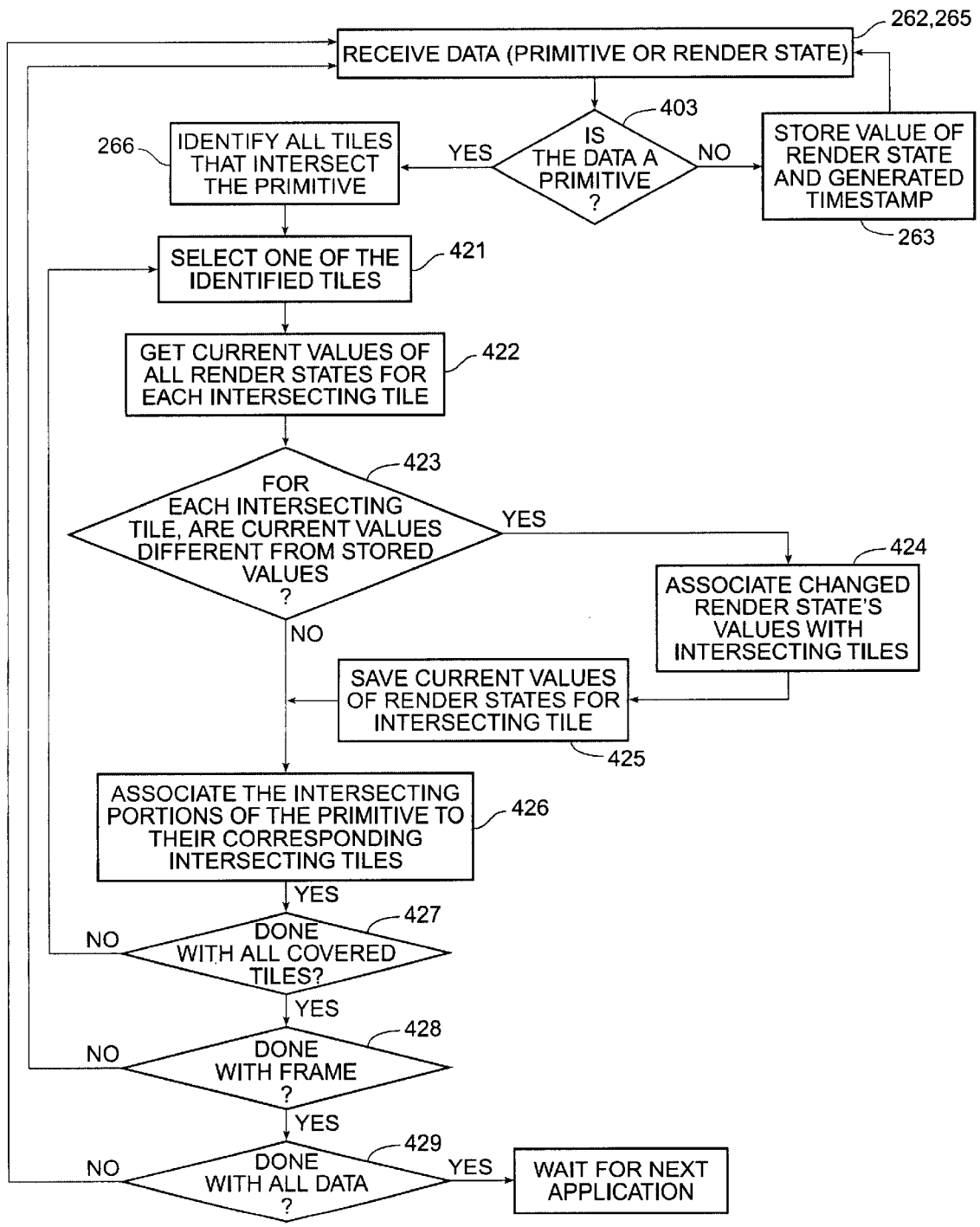
FIG. 4B illustrates, in another low-level flow chart, acts performed by a render state controller in an alternative implementation of the controller.

Another implementation of the variant illustrated in FIG. 3 is a method 420 (illustrated in FIG. 4B) that is similar to the above-discussed method but does not use time as the sequence signal. As illustrated in FIG. 4B, generation of a timestamp and storage of the generated timestamp are not performed (i.e. acts 402 and 302 are omitted in FIG. 4B). In this implementation, instead of update sequence storage elements 249A–249P, tile-specific memory 249 (FIG. 2D) includes sets 242A–242P, wherein each set 242I corresponds to a tile and includes a number of previous value storage elements 242IA–242IZ. Values in these storage elements 242IA–242IZ are retrieved in act 422 (instead of retrieving the timestamp in act 404 for a covered tile).

Next, the retrieved values are compared (see act 423 in FIG. 4B) with the values in render state storage elements 247A–247Z, to identify the changed render states. If any render states have changed, the changed render states are associated (in acts 424 and 426) with the primitive portion for the current tile (e.g. by storing the changed render states as well as the primitive portion in tile-specific memory 251J). About this time, render state controller also performs act 425 to save the current values of the render states as being the most recent values updated to this particular tile (for use in comparison in act 423 in a future frame). If no render states have changed, render state controller 217 goes from act 423 directly to act 426 to associate only the primitive portion with the corresponding tile. Thereafter, render state controller 217 performs acts 427–429 that are similar or identical to the corresponding acts 412, 413 and 414 (described above in reference to FIG. 4A).

Figure 5A:
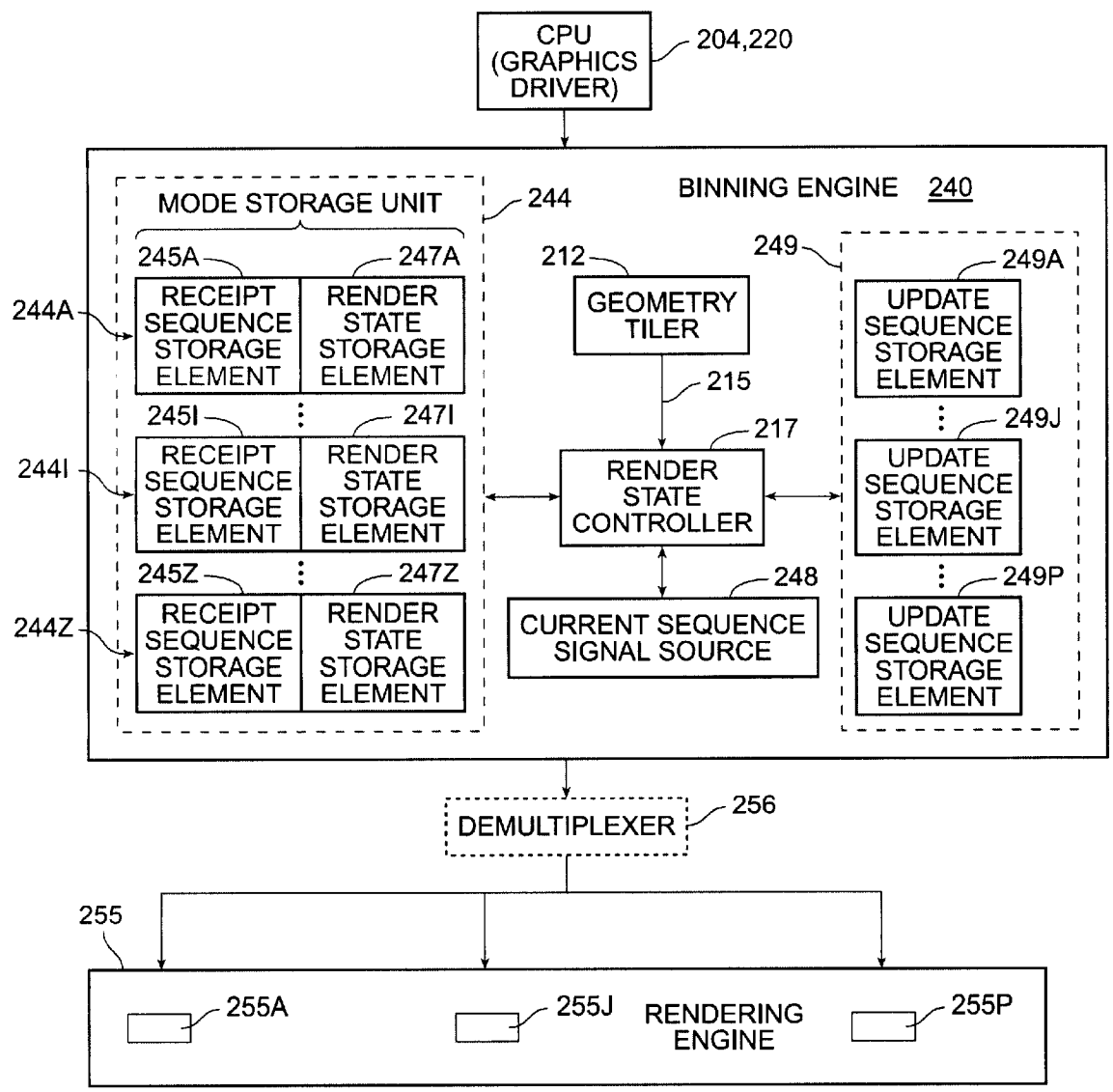
FIG. 5A illustrates, in an intermediate-level block diagram similar to FIG. 2C, multiple tile renderers included in the graphics processor in an alternative embodiment of the invention.
Figure 5B:
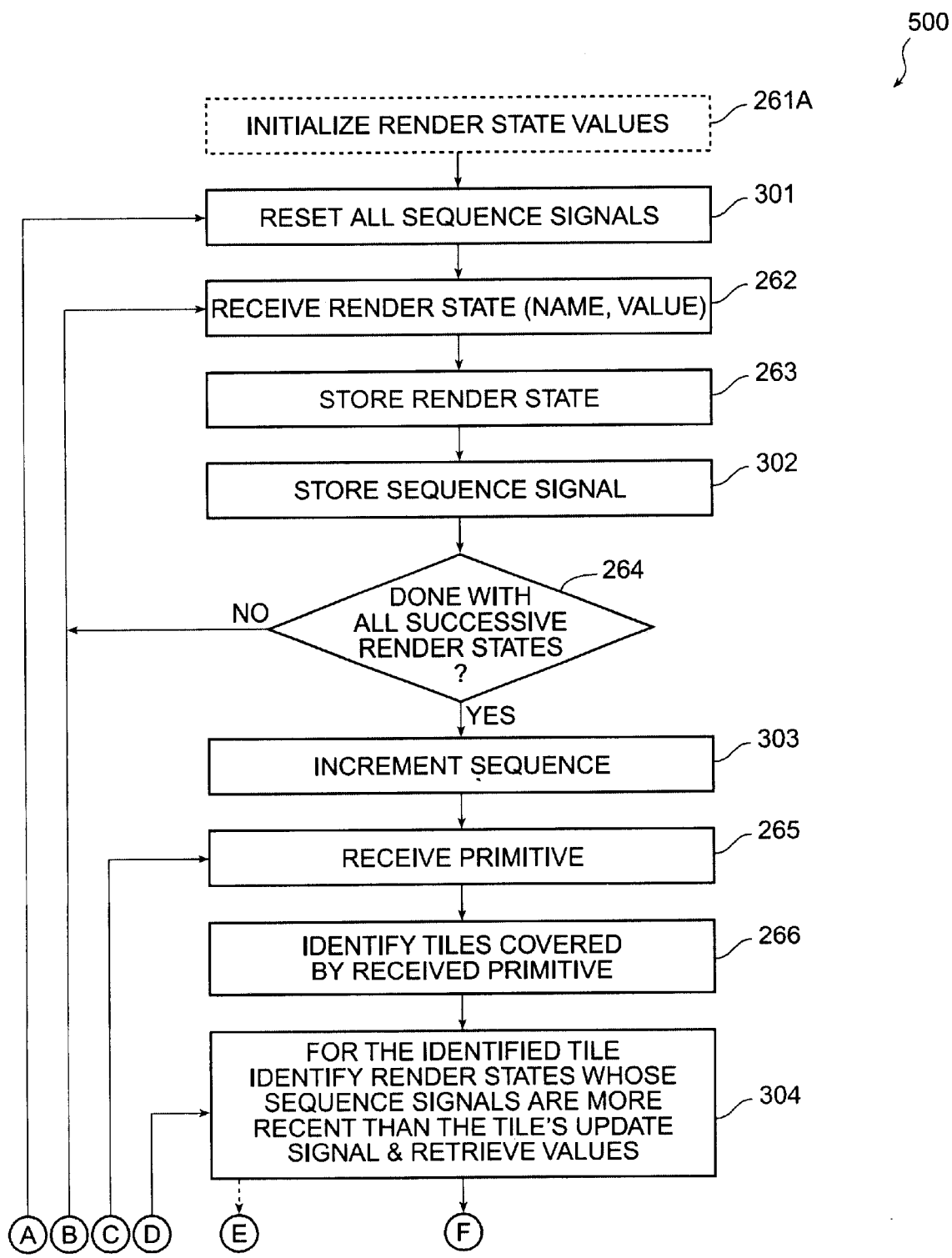
FIGS. 5B and 5C illustrate, in high-level flow charts, acts performed by a render state controller and by a tile renderer respectively that are included in the graphics processor illustrated in FIG. 5A.
Figure 5B:
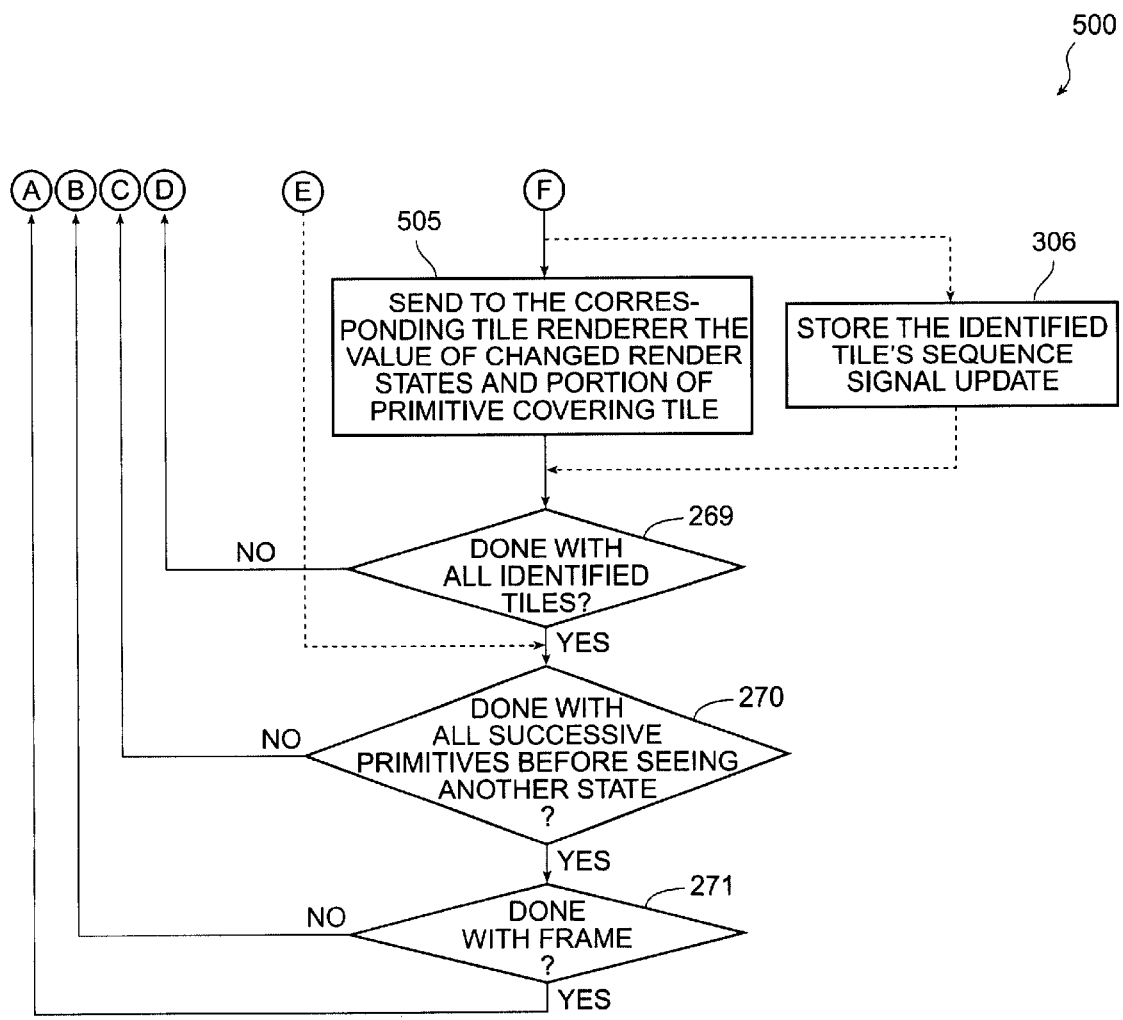

In another embodiment, a rendering pipeline 255 (FIG. 5A) includes a number of circuits 255A–255P (called "tile renderers") that operate in parallel with each other. Each of tile renderers 255A–255P is dedicated to processing the graphics data for a single one of tiles 201A–201P (FIG. 2A). In this embodiment, render state controller 217 performs acts in a method 500 that are similar or identical to the corresponding acts performed in method 300 (described above) except for the following differences. Instead of act 305, method 500 includes act 505 (FIG. 5B). In act 505, render state controller 217 does not merely store the changed render states and the primitive, but instead sends the changed render states and the primitive to a tile renderer 255J for the identified tile 201J.

Figure 5C:
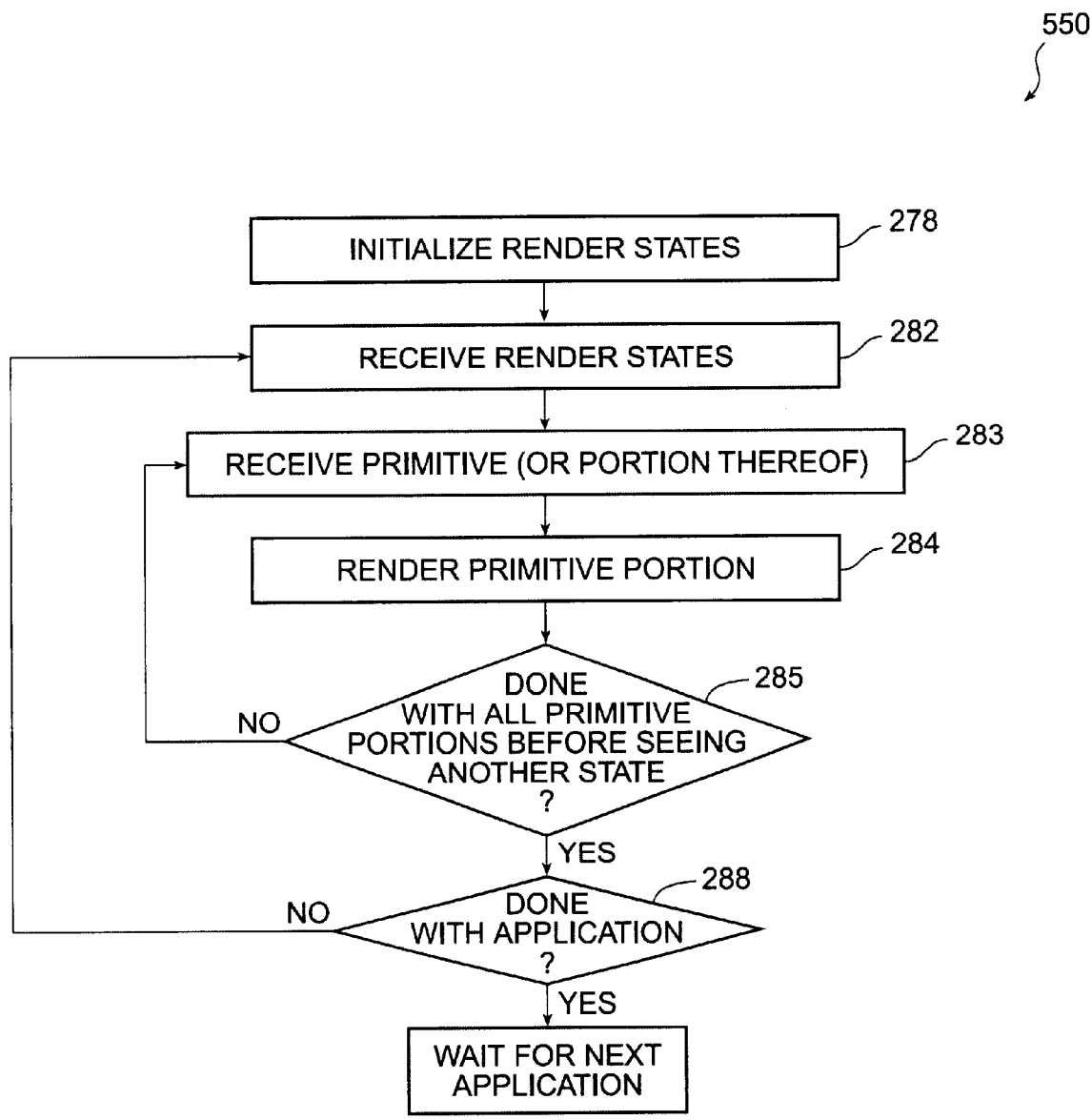

Moreover, in act 304 if there are no render states that have changed values, then render state controller 217 goes directly to act 270 (as shown by the dotted arrow). Also, in this embodiment, each tile renderer 255J performs acts 282–285 and 288 (see method 550 in FIG. 5C) described above in reference to FIG. 2F (note that acts 286 and 287 are skipped). Note that in this embodiment, one or more tile renderers 255A–255P operate on data for a frame that is being currently received by binning engine 240 (i.e. in this embodiment, there is no storage of data). In an alternative embodiment, all tile renderers 255A–255P operate on data for a frame that has been previously received and stored by binning engine 240.

Figure 6:
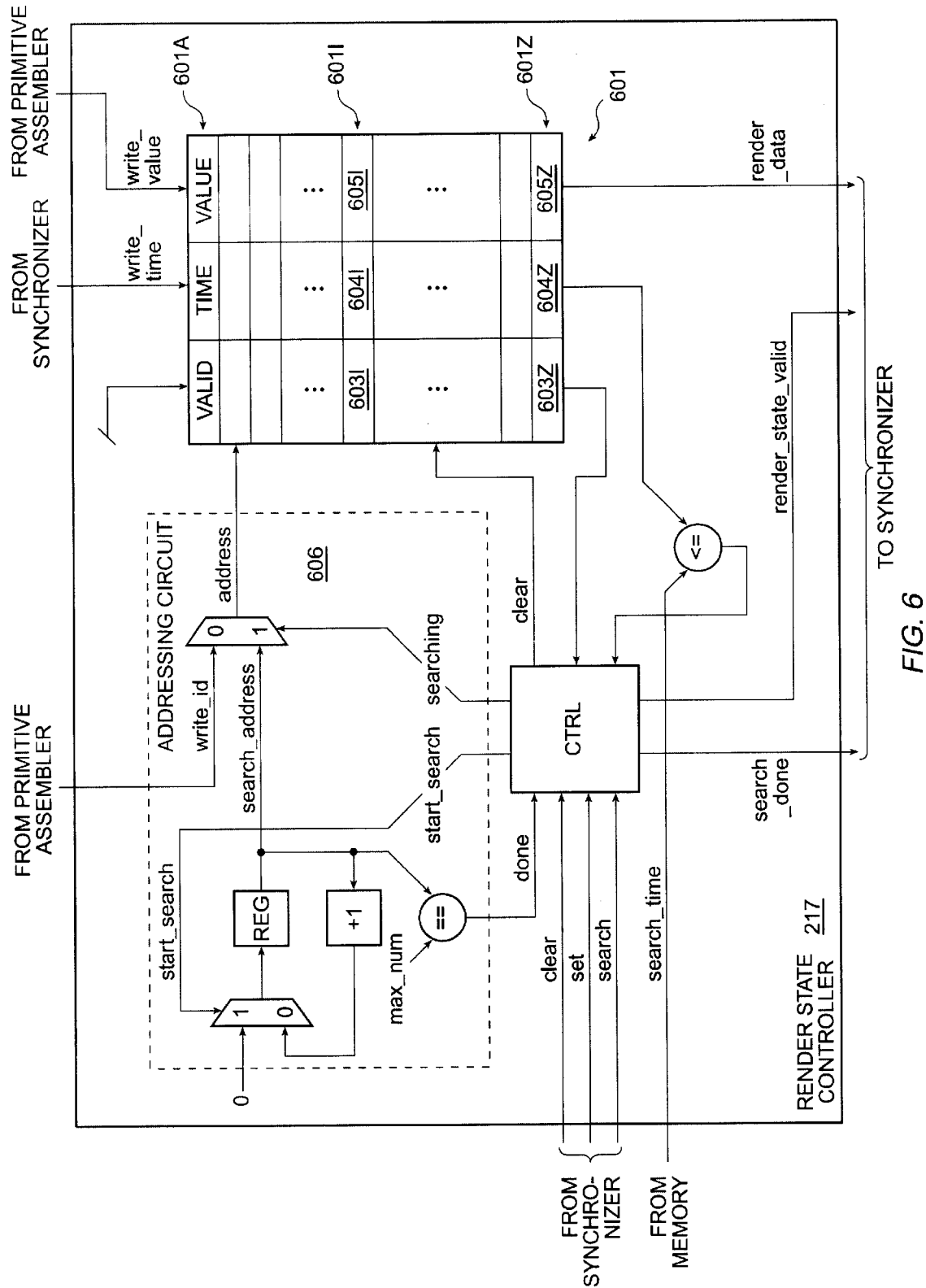
FIG. 6 illustrates, in a low level block diagram, one implementation of a render state controller illustrated in FIG. 2A.

In one implementation, render state controller 217 (FIG. 6) includes a memory 601 and a control circuit 602 that stores in memory 601 signals that are received from primitive assembler 215, and supplies the stored signals to synchronizer 216 (FIG. 2A). Memory 601 includes a number of queue elements 601A–601Z (wherein A≦I≦Z, Z being the total number of elements, e.g. 64). Each queue element 601I includes a valid storage element 603I, a time storage element 604I and a value storage element 605I.

Control circuit 602 is responsive to three signals, namely signal "clear", signal "set" and signal "search" that are generated by synchronizer 216 (FIG. 2A) as described in the related U.S. patent application, Ser. No. 09/271,613 that is incorporated by reference above. Specifically, in response to the signal "clear" going active, circuit 602 resets each valid storage element 603I (e.g. stores a "0"). Moreover, in response to the signal "set" going active, circuit 602 sets a specific valid storage element 603I (e.g. stores a "1") in a queue element 601I that is identified by a signal "write_id" supplied by synchronizer 216. At the same time, circuit 602 also stores signals "write_time" provided by synchronizer 216 and "write value" provided by render state FIFO (also called "token buffer") 208 into corresponding storage elements 604I and 605I that are included in the identified queue element 601I.

Furthermore, in response to the signal "search" going active, circuit 602 compares with signals in each of time storage elements 604A–604Z the signal "search_time" provided by graphics memory 230 (e.g. specifically by a tile update storage element as described in the related U.S. patent application, Ser. No. 09/271,613. For each time storage element 604I having a value greater than or equal to the value of signal "search_time," control circuit 602 uses an addressing circuit 606 to supply signals from the corresponding value storage element 605I to be supplied as the signal "render_data" to synchronizer 216. While supplying the just-described signal "render_data", circuit 602 also drives a signal "render_state_valid" active to synchronizer 216. On completion of supplying the just-described signal "render_data", circuit 602 drives a signal "search_done" active to synchronizer 216. In one embodiment, synchronizer 216 and controller 217 are pipelined, with registers (not shown) that hold intermediate values of signals passing between synchronizer 216 and controller 217.

The following Table 1 indicates the locations in microfiche Appendix A at which various acts illustrated in FIG. 4A are performed:

TABLE 1

| Acts in FIG. 4A | Microfiche Appendix A |
|---|---|
| 401 | p. 23, top, p. 26, middle |
| 262 | p. 23, top third |
| 265 | p. 23, top third |
| 402 | p. 23, top third |
| 403 | p. 23, bottom |
| 263 | p. 23, middle, p. 26, third quarter |
| 302 | p. 23, middle, p. 26, third quarter |
| 266 | p. 18, top half |
| 404 | p. 24, second quarter |
| 405 | p. 24, middle |
| 406 | p. 24, middle |
| 407 | p. 24, middle |
| 408 | p. 24 middle, p 26 bottom |
| 409 | p. 24, middle |
| 410 | p. 24, bottom |
| 411 | p. 24, middle |
| 412 | p. 24, bottom |
| 413 | p. 25, top |
| 414 | not applicable |

The following Table 2 indicates the locations in microfiche Appendix A at which various acts illustrated in FIG. 5B are performed:

TABLE 2

| Acts in FIG. 5B | Microfiche Appendix A |
|---|---|
| 261 | p. 23, top |
| 301 | p. 23, top, p. 26 middle |
| 262 | p. 23, middle |
| 263 | p. 23, middle, p. 26, third quarter |
| 264 | p. 23, middle |
| 302 | p. 23, middle, p. 26, third quarter |
| 303 | p. 23, second quarter |
| 265 | p. 23, bottom |
| 266 | p. 24, middle |
| 304 | p. 24, middle, p. 26, bottom |
| 505 | p. 24, middle towards bottom |
| 306 | p. 24, middle |
| 269 | p. 24, bottom |
| 270 | p. 24, bottom |
| 271 | p. 25, top |

In the above description, several embodiments, variants, and implementations of the render state controller are described by reference to various specific elements and combinations thereof, although such elements and combinations are not essential to practicing the invention. Specifically, numerous modifications and adaptations of the above-described embodiments will be apparent to a person of skill in the art of designing digital circuits in view of the enclosed disclosure. For example, another embodiment of the invention can be obtained by combining two aspects of the above described embodiments wherein some render states (such as fog) are maintained in the next frame memory 244 common to all tiles 201A–201P, and other render states (such as texture) are maintained in tile-specific memory 249 as being specific to each tile 201J.

In yet another embodiment, instead of having receipt sequence storage elements, a queue of identities of render states that have changed is maintained in next frame memory 244, and each time that render state controller 217 increments the signal in current sequence signal source 248, render state controller 217 also saves a copy of the sequence signal in the queue. In such an embodiment, the sequence signal in the queue is thereafter compared with the sequence signal in the update sequence storage element to decide whether to bin a render state to a tile or not.

As another example, any method, such as a bounding box method or a precise method can be used to identify tiles covered by a graphics primitive. In the bounding box method, a rectangle (called "bounding box") that touches the vertices of a triangle to be binned is drawn, and all tiles within such a bounding box are identified as being the tiles covered by the primitive. Bounding boxes (also called "extent" boxes) are described in Computer Graphics, Principles and Practice, Second Edition in C, Foley, van Dam, Feiner and Hughes, Addison-Wesley Publishing Company, 1990 (see pages 660–663 and 336–337 that are incorporated by reference herein in their entirety). An example of the precise method is described in the U.S. patent application, Ser. No. 09/271,637 that is incorporated by reference herein in its entirety.

As yet another example, although in one embodiment a single renderer processes data for all the tiles in a screen, and in another embodiment a single renderer processes data for only one tile in a screen, in yet another embodiment, data for a group of tiles (but not all tiles) in a screen is processed by a single renderer (an example of such a single renderer may process data for all tiles in a column, or alternatively data for all tiles in a row).

Furthermore, the comparisons of signals stored in the next frame memory with one or more signal(s) stored in the tile-specific memory can be performed in parallel with each other (e.g. by use of a number of comparators that are included in such an embodiment).

Various such modifications and adaptations are encompassed by the attached claims.

What is claimed is:

1. A method for processing a plurality of primitives and a plurality of values of a plurality of render states that are used to render for display on a screen of a computer at least one primitive in said plurality of primitives, the method comprising:

receiving a value of a render state, hereinafter changed render state, in the plurality of render states;

storing said value of said changed render state;

receiving a primitive in the plurality of primitives;

identifying at least said changed render state from among the plurality of render states for a tile that is affected by said primitive;

retrieving said value of said changed render state; and associating with said tile an identity of said changed render state and said value;

wherein said tile is included in a group of tiles formed by pixels on said screen.

2. The method of claim 1 further comprising:

repeating said identifying, said retrieving, and said associating for each tile that is covered at least partially by the primitive, said each tile being included in said group of tiles.

3. The method of claim 1 further comprising:

storing a receipt sequence signal indicative of an order of receipt of said value of said changed render state relative to receipt of values of other render states in the plurality of render states;

storing an update sequence signal indicative of an order of said identifying relative to said receipt sequence signal; and comparing the receipt sequence signal with the update sequence signal of said tile, and performing said associating only if the receipt sequence signal is more recent than the update sequence signal.

4. The method of claim 3 wherein:

each of said sequence signals indicates time elapsed relative to the beginning of a frame.

5. The method of claim 3 wherein:

said comparing is performed for each tile in a group of tiles that are covered at least partially by the primitive, said tile being included in said group.

6. The method of claim 1 wherein:

said associating includes storing the value into a storage element corresponding to said tile.

7. The method of claim 1 wherein:

said associating includes sending the value to a tile renderer for said tile.

8. The method of claim 1 further comprising:

storing said value of said changed render state as a previous value for said tile; and comparing a new value of said changed render state with said previous value and performing said identifying, said retrieving and said associating only if said new value is different from said previous value.

9. A circuit in a graphics processor for processing a plurality of primitives and a plurality of values of a plurality of render states that are used to render for display on a screen of a computer said plurality of primitives, the circuit comprising:

a first memory having a plurality of storage units, each storage unit including at least a first storage element;

a second memory having a plurality of second storage elements; and a render state controller having a first input bus to receive therefrom said plurality of values, the render state controller further having a second input bus to receive therefrom at least one tile affected by a primitive in said plurality of primitives, the render state controller being coupled to the first memory to store a value of a first render state in a storage unit in said plurality of storage units in said first memory on receipt of the value from the first input bus, the render state controller being further coupled to the second memory to receive therefrom a second signal held in a second storage element, wherein the render state controller compares the second signal with a first signal held in the first storage element of said storage unit after receipt of said one tile, and passing said value from said storage unit to an output bus depending on the result of said comparison.

10. The circuit of claim 9 further comprising a source of a current sequence signal, said source being coupled to said render state controller, wherein:

said first storage element is a receipt sequence storage element, and the render state controller stores said signal from said source into the receipt sequence storage element of said storage unit on receipt of the value from the input bus; and said second storage element is an update sequence storage element, and the render state controller passes said value to an output bus of said circuit for association of said value with said one tile if the signal in the receipt sequence storage element is more recent than the signal in the update sequence storage element, and the render state controller stores said signal from said source into the update sequence storage element to indicate association of said value with said tile.

11. The circuit of claim 10 wherein:

said source includes a clock source and said current sequence signal indicates time relative to the beginning of a to-be-displayed frame.

12. The circuit of claim 9 wherein:

said first storage element is a render state storage element, and the render state controller stores said value into the render state storage element on receipt of the value; and said second storage element is a previous value storage element, and the render state controller passes said value to an output bus of said circuit for association of said value with said one tile if the signal in the render state storage element is different from the signal in the previous value storage element, and the render state controller stores said value into the previous value storage element to indicate association of said value with said tile.

* * * * *